United States Patent
Bass

(10) Patent No.: US 6,382,653 B1
(45) Date of Patent: May 7, 2002

(54) VEHICLE HITCH POSITIONING APPARATUS AND METHOD

(76) Inventor: James S. Bass, 277 Baker Dr., Longs Peak Rt., Estes Park, CO (US) 80517

(*) Notice: Subject to any disclaimer, the term of this patent is extended or adjusted under 35 U.S.C. 154(b) by 140 days.

(21) Appl. No.: 09/075,943

(22) Filed: May 12, 1998

(51) Int. Cl.$^7$ ................................................. B60D 1/36
(52) U.S. Cl. ..................... 280/477; 280/478.1; 280/511
(58) Field of Search ............................ 280/477, 478.1, 280/511

(56) References Cited

U.S. PATENT DOCUMENTS

| | | | | |
|---|---|---|---|---|
| 3,559,827 A | * | 2/1971 | Schier | 214/86 |
| 3,731,274 A | | 5/1973 | Green | 340/52 R |
| 3,773,356 A | | 11/1973 | Eichels et al. | 280/477 |
| 4,187,494 A | | 2/1980 | Jessee | 340/52 R |
| 4,432,563 A | * | 2/1984 | Pitcher | 280/477 |
| 4,657,275 A | * | 4/1987 | Carroll | 280/477 |
| 4,708,359 A | * | 11/1987 | Davenport | 280/477 |
| 4,802,686 A | | 2/1989 | Isreal | 280/477 |
| 4,852,901 A | | 8/1989 | Beasley et al. | 280/477 |
| 4,903,978 A | * | 2/1990 | Schrum, III | 280/477 |
| 5,080,386 A | | 1/1992 | Lazar | 280/477 |
| 5,114,170 A | * | 5/1992 | Lanni et al. | 280/477 |
| 5,161,815 A | | 11/1992 | Penor, Jr. | 280/477 |
| 5,330,196 A | | 7/1994 | Ricles | 280/477 |
| 5,435,587 A | * | 7/1995 | Beddows | 280/477 |
| 5,465,992 A | | 11/1995 | Anderson | 280/477 |
| 5,503,422 A | | 4/1996 | Austin | 280/477 |
| 5,516,139 A | | 5/1996 | Woods | 28/477 |
| 5,529,330 A | | 6/1996 | Roman | 280/477 |
| 5,758,893 A | * | 6/1998 | Schultz | 280/477 |

* cited by examiner

Primary Examiner—Robert P. Olszewski
Assistant Examiner—James S. McClellan
(74) Attorney, Agent, or Firm—Armstrong, Westerman & Hattori, LLP

(57) ABSTRACT

A vehicle hitch positioning apparatus and method for positioning a vehicle hitch over a trailer ball accurately, without the problems of lifting and positioning the vehicle hitch manually. The vehicle hitch positioning apparatus includes a base plate having a first hole through which the trailer ball is inserted, the base plate being attached to the vehicle by the trailer ball; a guide plate connected to the base plate and made to be in alignment with the base plate, the guide plate having a second hole through which the trailer ball is inserted, and the guide. plate guiding and supporting the trailer hitch into position over the second hole; and a movable catch for holding the guide plate in an apart position from the base plate. In operation, after the base plate is fixed to the vehicle using the trailer ball, the vehicle hitch is guided and positioned over the second hole by the guide plate, the movable catch is moved in a predetermined direction to release and drop the guide plate such that the trailer ball is inserted through the second hole and the guide plate drops and aligns with the base plate, and the vehicle hitch is securely positioned over the trailer ball.

14 Claims, 5 Drawing Sheets

US 6,382,653 B1

VEHICLE HITCH POSITIONING APPARATUS AND METHOD

The present invention relates to a vehicle hitch positioning apparatus and a method for positioning and dropping a vehicle hitch on a trailer ball using the vehicle hitch positioning apparatus.

BACKGROUND OF THE INVENTION

A variety of vehicle hitch positioning apparatuses are in existence which position a vehicle hitch of a trailer or other movable object over a trailer ball on a vehicle, and have included complicated structures involving cables and reels, as well as infrared positioning sensors for detecting and aligning both trailer and vehicle.

Other simpler devices include V-shaped and U-shaped guides attached to the vehicle around the trailer ball, which guide the vehicle hitch over the trailer ball. However, these devices require lifting and manually positioning the vehicle hitch which is cumbersome and difficult for the user, and many also utilize pins which secure the vehicle hitch from moving away from the trailer ball, which make the securing pins vulnerable to breakage.

Still other devices utilize ramps which self-align the vehicle hitches over the trailer ball, but those devices require locks or pins to prevent the vehicle hitch from slipping off the trailer ball, which are also vulnerable to breakage.

SUMMARY OF THE INVENTION

An object of the present invention is to provide a simple device wherein a single user can position a vehicle hitch over a trailer ball accurately, without the usual problems of lifting and positioning the vehicle hitch manually.

The vehicle hitch positioning apparatus of the present invention includes a base plate having a first hole through which the trailer ball is inserted, the base plate being connected to the vehicle by the trailer ball; a guide plate connected to the base plate and made to be aligned with the base plate, the guide plate having a second hole through which the trailer ball is inserted, and the guide plate guiding and supporting the trailer hitch into position over the second hole; and a movable catch for holding the guide plate in an apart position from the base plate prior to alignment with the base plate. In operation, after the base plate is fixed to the vehicle using the trailer ball, the vehicle hitch is guided and positioned over the second hole by the guide plate, the movable catch is moved in a predetermined direction to release and drop the guide plate such that the trailer ball is inserted through the second hole and the guide plate drops and aligns with (covers) the base plate, and the vehicle hitch is securely positioned over the trailer ball.

BRIEF DESCRIPTION OF THE DRAWINGS

Other features and advantages of the invention will be apparent from the following description taken in connection with the accompanying drawings, wherein.

DETAILED DESCRIPTION OF THE PREFERRED EMBODIMENTS

Figure 1:
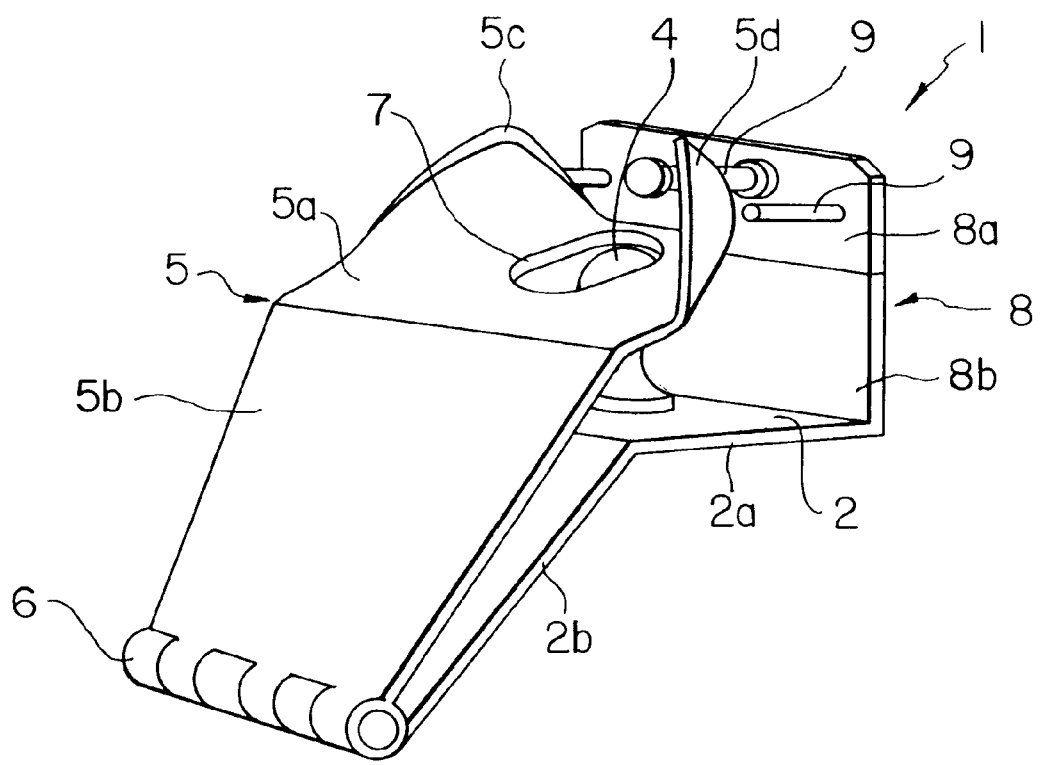
FIG. 1 shows a perspective view of the vehicle hitch positioning apparatus according to one embodiment, where the guide plate of the apparatus is in the apart position from the base plate.

A completed assembly of the first embodiment of the vehicle hitch positioning apparatus 1 of the present invention is described as follows, and is shown in FIG. 1.

The vehicle hitch positioning apparatus 1 includes a base plate 2 having a horizontal portion 2a and an inclined portion 2b, with a hole 3 disposed in a central portion of the horizontal portion 2a, through which a trailer ball 4 is inserted to fix the base plate 2 to the vehicle.

A guide plate 5, having an upper, substantially horizontal portion 5a and a lower inclined portion 5b, is connected to the lower end of the inclined portion 2b of the base plate 2 by a hinge 6. The guide plate 5 and the base plate 2 are made such that they are in alignment, one on top of the other, in the unused state.

The guide plate 5 has a hole 7 disposed in a central portion of the upper portion 5a, which is centered over hole 3 of the base plate 2, and through which the trailer ball 4 is also inserted. The guide plate 5 has guide portions 5c, 5d which curve inwards and narrow in width toward the top end of the upper portion 5a, and which guide the vehicle hitch 13 and accurately position-it over the hole 7, and above the trailer ball 4.

A movable catch 8 (see FIG. 2) which is a vertical plate 8, either formed as one piece, or at least two pieces which includes an upper portion 8a and lower portion 8b, is connected to the base plate 2.

Figure 4:
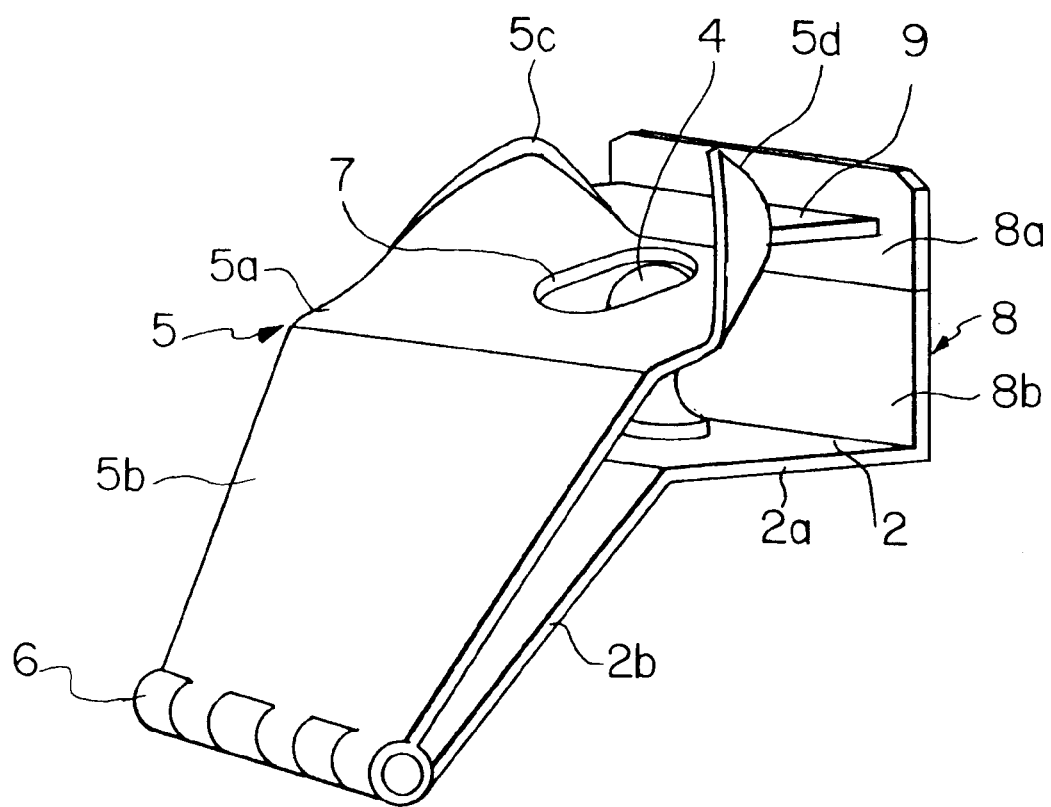
FIG. 4 shows a perspective view of the vehicle hitch positioning apparatus according to another embodiment, where the projection from the vertical plate is a ledge.

The vertical plate 8 includes a projection extending from the upper portion of the vertical plate 8. The projection can be a ledge in one embodiment (see FIG. 4), or a plurality of bolts 9 as in the present embodiment, as shown in FIG. 2.

Figure 2:
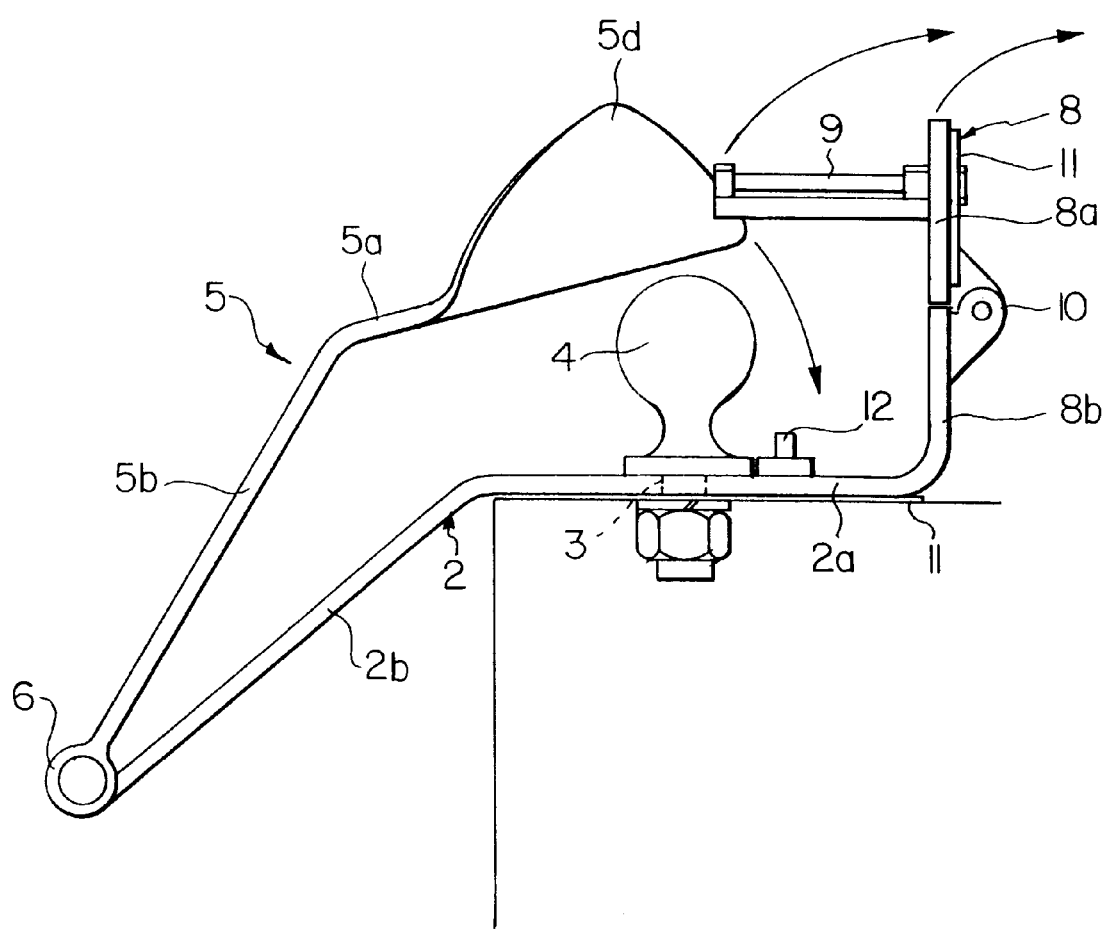
FIG. 2 shows a side view of the vehicle hitch positioning apparatus according to the embodiment of FIG. 1, and showing the switch of another embodiment.

As shown in the embodiment in FIG. 2, if the vertical plate 8 is formed of two pieces (upper portion 8a and lower portion 8b), the upper portion 8a of the vertical plate 8 is connected to the lower portion 8b of the vertical plate 8 using a hinge 10, and the lower portion 8b of the vertical plate 8 is connected to the top end of the upper portion 2a of the base plate 2.

Figure 5:
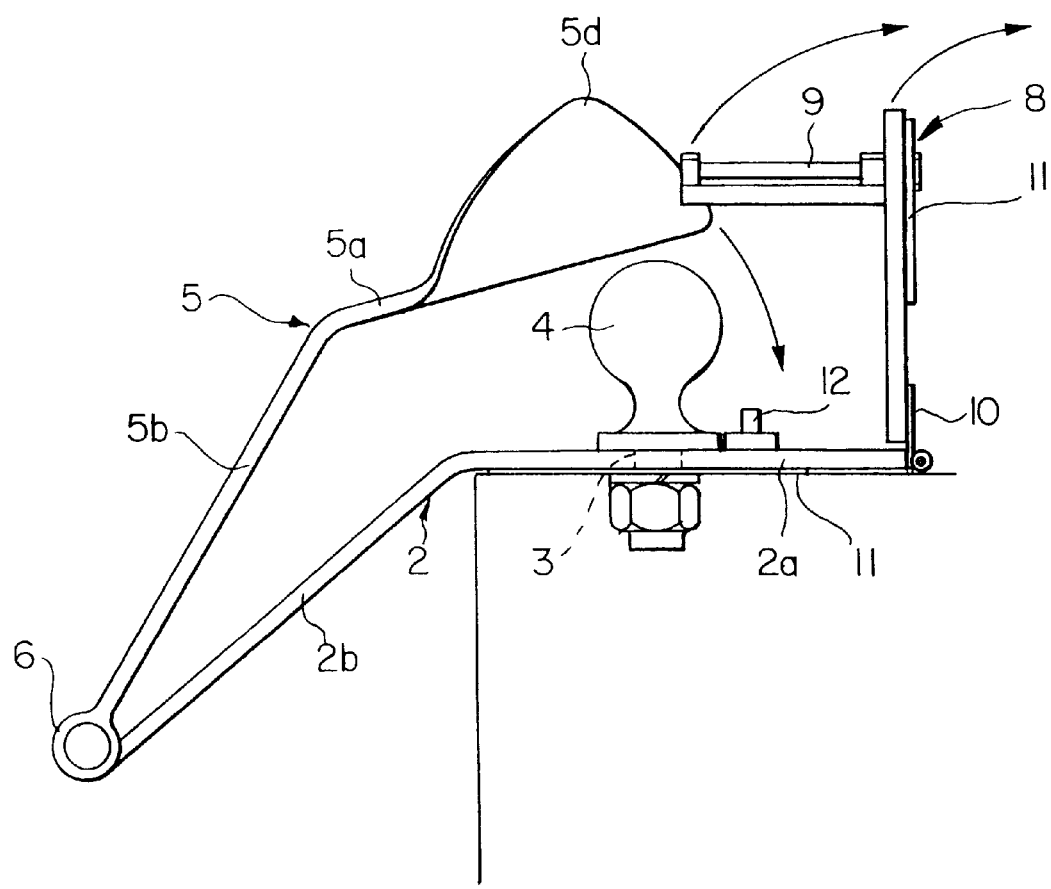
FIG. 5 shows a side view of the vehicle hitch positioning apparatus according to another embodiment, where the hinge is placed between the vertical and base plates.

Although the lower portion 8b of the vertical plate 8 is formed of one piece with the base plate 2 in the embodiment, the vertical plate 8 can be provided separately from the base plate 2, or in another embodiment, the hinge 10 can be provided at the intersection of the vertical plate 8 and base plate 2 if the vertical plate 8 is formed from one piece (see FIG. 5).

The projections 9 extend in a horizontal direction from the upper portion 8a of the vertical plate 8, and support the top end of the upper portion 5a of the guide plate 5, keeping the base plate 2 and the guide plate 5 apart.

The base plate 2 and the vertical plate 8 can be optionally provided with a protective material 11 (i.e., rubber,) on the underside of the base plate 2 or the side of the vertical plate 8 nearest the vehicle, to prevent damage to the vehicle, or the protective material can be provided separately on the vehicle itself.

The base plate 2, guide plate 5, vertical plate 8, and projections 9, can all be made of a metal or other hard, durable material.

In operation of the above embodiment, the base plate 2 of the vehicle positioning apparatus 1, is applied to the back of the vehicle, and the trailer ball 4 is inserted through the hole 3 and the trailer ball 4 is bolted down to the vehicle.

The top end of the upper portion 5a of the guide plate 5, is supported on the projections 9 which extend horizontally from the upper portion 8a of the vertical plate 8.

The vehicle is backed up to the vehicle hitch 13 as accurately as possible, and the vehicle hitch 13 is placed on the guide plate 2. The vehicle hitch 13 is then guided into position by the guide plate 5 such that the vehicle hitch 13 is directly over the hole 7 and over the trailer ball 4.

Figure 3:
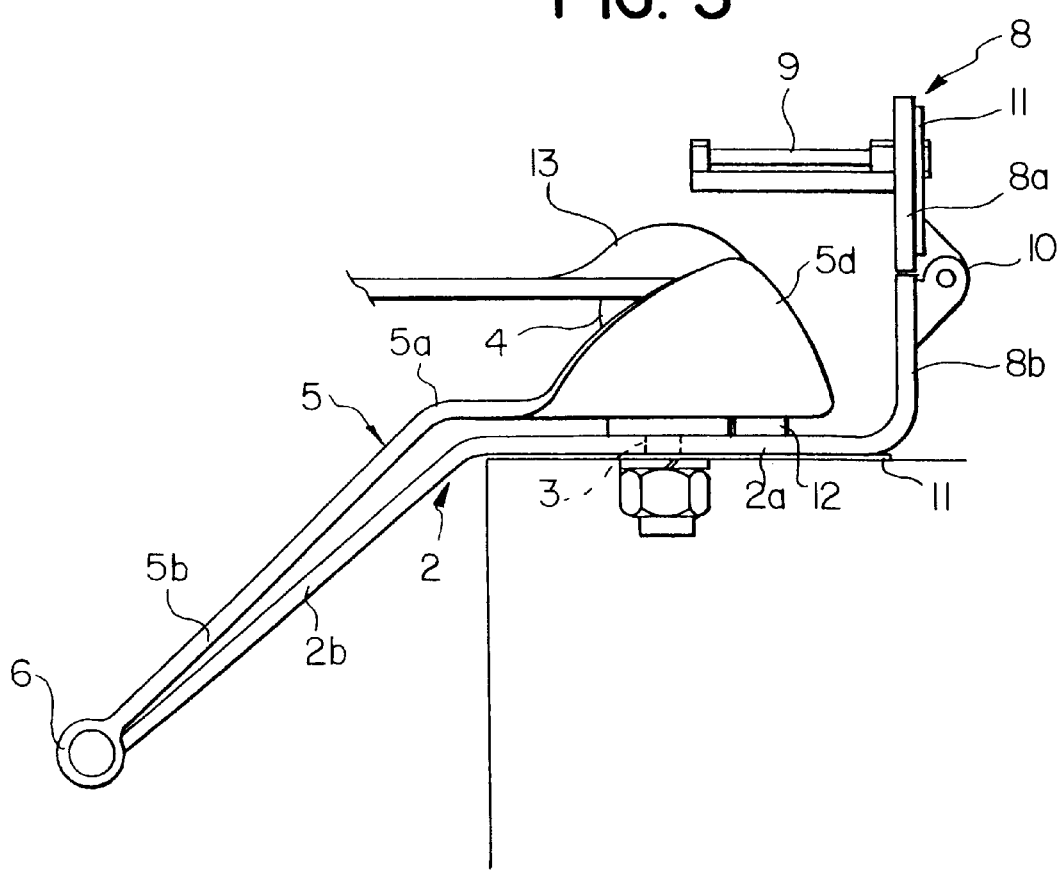
FIG. 3 shows a side view of the vehicle hitch positioning apparatus according to the embodiment of FIG. 2 where the vehicle hitch is completely secured over the trailer ball and the switch is depressed.

The upper portion 8a of the movable catch 8 is then moved backwards, in a direction away from the vehicle hitch 13 (see FIG. 2), allowing the projections 9 to move away from the guide plate 5, and allowing the upper portion 5a of the guide plate 5 to drop down onto the base plate 2, wherein the trailer ball 4 is inserted through the hole 7 in the guide plate 5, and the vehicle hitch 13 is accurately dropped down on top of the trailer ball 4 (see FIG. 3).

The vehicle hitch 13 is then tightened down by attaching safety chains and trailer lights, if necessary.

With this one simple device, a single user can more easily and quickly hitch up a trailer to a vehicle accurately, without the usual problems of lifting and positioning the trailer tongue.

After removing the vehicle hitch 13 from the trailer ball 4, the movable catch 8 can be reset by raising the guide plate 5 and allowing it to rest on the projections 9 of the vertical plate 8.

Another embodiment of the device includes a light in the vehicle, as a safety device, which shows that the movable catch 8 has been tripped. A switch 12 (see FIGS. 2, 3, and 5), which is part of the positioning apparatus, can be positioned under the vehicle hitch 13 at any appropriate location, and adjusted to a certain height. The switch 12 is water-proof and wear-resistant.

When the vehicle hitch 13 is positioned on the trailer ball 4, the switch 12 would be partially depressed, turning on a light or buzzer or both.

When the vehicle hitch 13 is tightened down, the switch 12 would be depressed the rest of the way, turning off the light or buzzer (see FIG. 3).

If the vehicle hitch 13 is not tightened properly or came loose, even partially, the light or buzzer would turn on once again, informing the user.

It is contemplated that numerous modifications may be made to the apparatus and procedure of the invention without departing from the spirit and scope of the invention as defined in the following claims.

What is claimed is:

1. A vehicle hitch positioning apparatus for positioning a vehicle hitch extending from a trailer onto a trailer ball attached to a vehicle, comprising:

a base plate having a first hole through which said trailer ball is inserted, said base plate being connected to the vehicle by said trailer ball;

a guide plate having a lower ramped portion and an upper slanted portion, said upper slanted portion having a lower angle of inclination with respect to a horizontal plane than said lower ramped portion, said upper slanted portion having lateral sides being formed into winged guide portions, said lower ramped portion of said guide plate being connected to said base plate for covering said base plate, said upper slanted portion of said guide plate having a second hole through which said trailer ball is inserted, said guide plate guiding and supporting said trailer hitch into position over said second hole;

a movable catch for holding said guide plate in an apart position from said base plate;

wherein when said movable catch is moved in a predetermined direction by a user after said trailer hitch is positioned over said second hole and said trailer ball, said movable catch releases and drops said guide plate such that said trailer ball is inserted through said second hole, said guide plate adjoins said base plate, and said trailer hitch is positioned over said trailer ball.

2. The vehicle hitch positioning apparatus according to claim 1, further comprising first connecting means for connecting said base plate and said lower ramped portion of said guide plate.

3. The vehicle hitch positioning apparatus according to claim 2, wherein said first connecting means is a hinge.

4. The vehicle hitch positioning apparatus according to claim 1, wherein said guide plate and said base plate are formed of one of a metal and a synthetic material.

5. The vehicle hitch positioning apparatus according to claim 1, further comprising a protective material fixed to at least one of said base plate and said movable catch, to protect said vehicle from damage.

6. The vehicle hitch positioning apparatus according to claim 1, wherein said movable catch comprises:

a vertical plate; and second connecting means for connecting said vertical plate to said base plate.

7. The vehicle hitch positioning apparatus according to claim 6, wherein said vertical plate further comprises:

at least one projection extending horizontally from said vertical plate, said projection being provided to support said guide plate;

wherein when said vertical plate is moved in a predetermined direction, said projection is moved in said predetermined direction and allows said guide plate to drop, and cover said base plate, thereby positioning said trailer hitch over said trailer ball.

8. The vehicle hitch positioning apparatus according to claim 6, wherein said second connecting means is a hinge.

9. The vehicle hitch positioning apparatus according to claim 1, wherein said movable catch comprises:

a vertical plate comprising an upper portion and a lower portion; and third connecting means for connecting said upper portion to said lower portion.

10. The vehicle hitch positioning apparatus according to claim 9, wherein said vertical plate further comprises:

at least one projection extending horizontally from said upper portion of said vertical plate, said projection being provided to support said guide plate;

wherein when said upper portion of said vertical plate is moved in a predetermined direction, said projection is moved in said predetermined direction and allows said guide plate to drop and cover said base plate, thereby positioning said trailer hitch over said trailer ball.

11. The vehicle hitch positioning apparatus according to claim 9, wherein said third connecting means is a hinge.

12. The vehicle hitch positioning apparatus according to claim 9, wherein said lower portion of said vertical plate and said base plate are integrally formed.

13. The vehicle hitch positioning apparatus according to claim 1, further comprising:

a switch positioned on said trailer hitch, such that when said guide plate falls and covers said base plate, said switch is partially depressed and activates a notification mechanism.

14. The vehicle hitch positioning apparatus according to claim 13, wherein said notification mechanism is at least one of a light and a buzzer.

* * * * *